United States Patent [19]

Orlando, Jr.

[11] Patent Number: 5,622,272
[45] Date of Patent: Apr. 22, 1997

[54] ADJUSTABLE ANGLE WALL MOUNTED RACK

[76] Inventor: Nicholas L. Orlando, Jr., Box 491, Plattekill- Ardonia Rd., Wallkill, N.Y. 12589

[21] Appl. No.: 382,597

[22] Filed: Feb. 2, 1995

[51] Int. Cl.[6] .................................................. A47F 7/00
[52] U.S. Cl. ............................................................ 211/90
[58] Field of Search ............................ 211/90, 42, 99, 211/150, 43

[56] References Cited

U.S. PATENT DOCUMENTS

| | | | |
|---|---|---|---|
| D. 142,497 | 10/1945 | Rider | 211/42 X |
| D. 165,940 | 2/1952 | Smilie | 211/42 X |
| 946,337 | 1/1910 | Clear | 211/150 X |
| 3,149,724 | 9/1964 | Magers | 211/42 |
| 3,387,713 | 6/1968 | Brooks | 211/42 X |
| 3,830,375 | 8/1974 | Larson | 211/150 X |
| 4,573,588 | 3/1986 | Cohen . | |
| 4,650,080 | 3/1987 | Kelley . | |
| 4,971,206 | 11/1990 | Lemmerman et al. . | |
| 5,031,780 | 7/1991 | Lemmerman et al. . | |
| 5,211,292 | 5/1993 | Paolucci . | |

*Primary Examiner*—Ramon O. Ramirez
*Assistant Examiner*—Sarah L. Purol

[57] ABSTRACT

A rack for supporting recording media adjacent to a wall surface is provided. The inventive device includes a first vertical member and a second vertical member securable to a wall surface. A plurality of shelf assemblies extend between the vertical assemblies for receiving and supporting recording media relative to the wall surface. Adjustment assemblies couple each of the shelf assemblies to the vertical members and permit angular adjustment of the shelf assembly about a horizontal axis extending orthogonally through the vertical members so as to position an upper rear corner of the recording media against the wall surface to which the device is attached.

5 Claims, 3 Drawing Sheets

ADJUSTABLE ANGLE WALL MOUNTED RACK

BACKGROUND OF THE INVENTION

1. Field of the Invention

The present invention relates to shelf structures and more particularly pertains to a rack for supporting recording media adjacent to a wall surface.

2. Description of the Prior Art

The use of shelf structures is known in the prior art. More specifically, shelf structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art shelf structures include U.S. Pat. No. 5,211,292; U.S. Pat. No. 5,031,780; U.S. Pat. No. 4,971,206; U.S. Pat. No. 4,650,080; and U.S. Pat. No. 4,573,588.

While these devices fulfill their respective, particular objectives and requirements, the aforementioned patents do not disclose a rack for supporting recording media adjacent to a wall surface which includes a first vertical member and a second vertical member securable to a wall surface, a plurality of shelf assemblies extending between the vertical assemblies for receiving and supporting recording media relative to the wall surface, and adjustment assemblies couple each of the shelf assemblies to the vertical members and permit angular adjustment of the shelf assembly about a horizontal axis extending orthogonally through the vertical members so as to position an upper rear corner of the recording media against the wall surface to which the device is attached.

In these respects, the adjustable angle wall mounted rack according to the present invention substantially departs from the conventional concepts and designs of the prior art, and in so doing provides an apparatus primarily developed for the purpose of supporting recording media adjacent to a wall surface.

SUMMARY OF THE INVENTION

In view of the foregoing disadvantages inherent in the known types of shelf structures now present in the prior art, the present invention provides a new adjustable angle wall mounted rack construction wherein the same can be utilized for supporting recording media adjacent to a wall surface. As such, the general purpose of the present invention, which will be described subsequently in greater detail, is to provide a new adjustable angle wall mounted rack apparatus and method which has many of the advantages of the shelf structures mentioned heretofore and many novel features that result in an adjustable angle wall mounted rack which is not anticipated, rendered obvious, suggested, or even implied by any of the prior art shelf structures, either alone or in any combination thereof.

To attain this, the present invention generally comprises a rack for supporting recording media adjacent to a wall surface. The inventive device includes a first vertical member and a second vertical member securable to a wall surface. A plurality of shelf assemblies extend between the vertical assemblies for receiving and supporting recording media relative to the wall surface. Adjustment assemblies couple each of the shelf assemblies to the vertical members and permit angular adjustment of the shelf assembly about a horizontal axis extending orthogonally through the vertical members so as to position an upper rear corner of the recording media against the wall surface to which the device is attached.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable angle wall mounted rack apparatus and method which has many of the advantages of the shelf structures mentioned heretofore and many novel features that result in an adjustable angle wall mounted rack which is not anticipated, rendered obvious, suggested, or even implied by any of the prior art shelf structures, either alone or in any combination thereof.

It is another object of the present invention to provide a new adjustable angle wall mounted rack which may be easily and efficiently manufactured and marketed.

It is a further object of the present invention to provide a new adjustable angle wall mounted rack which is of a durable and reliable construction.

An even further object of the present invention is to provide a new adjustable angle wall mounted rack which is susceptible of a low cost of manufacture with regard to both materials and labor, and which accordingly is then susceptible of low prices of sale to the consuming public, thereby making such adjustable angle wall mounted racks economically available to the buying public.

Still yet another object of the present invention is to provide a new adjustable angle wall mounted rack which provides in the apparatuses and methods of the prior art some of the advantages thereof, while simultaneously overcoming some of the disadvantages normally associated therewith.

Still another object of the present invention is to provide a new adjustable angle wall mounted rack for supporting recording media adjacent to a wall surface.

Yet another object of the present invention is to provide a new adjustable angle wall mounted rack which includes a first vertical member and a second vertical member securable to a wall surface, a plurality of shelf assemblies extending between the vertical assemblies for receiving and supporting recording media relative to the wall surface, and adjustment assemblies couple each of the shelf assemblies to the vertical members and permit angular adjustment of the shelf assembly about a horizontal axis extending orthogonally through the vertical members so as to position an upper rear corner of the recording media against the wall surface to which the device is attached.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
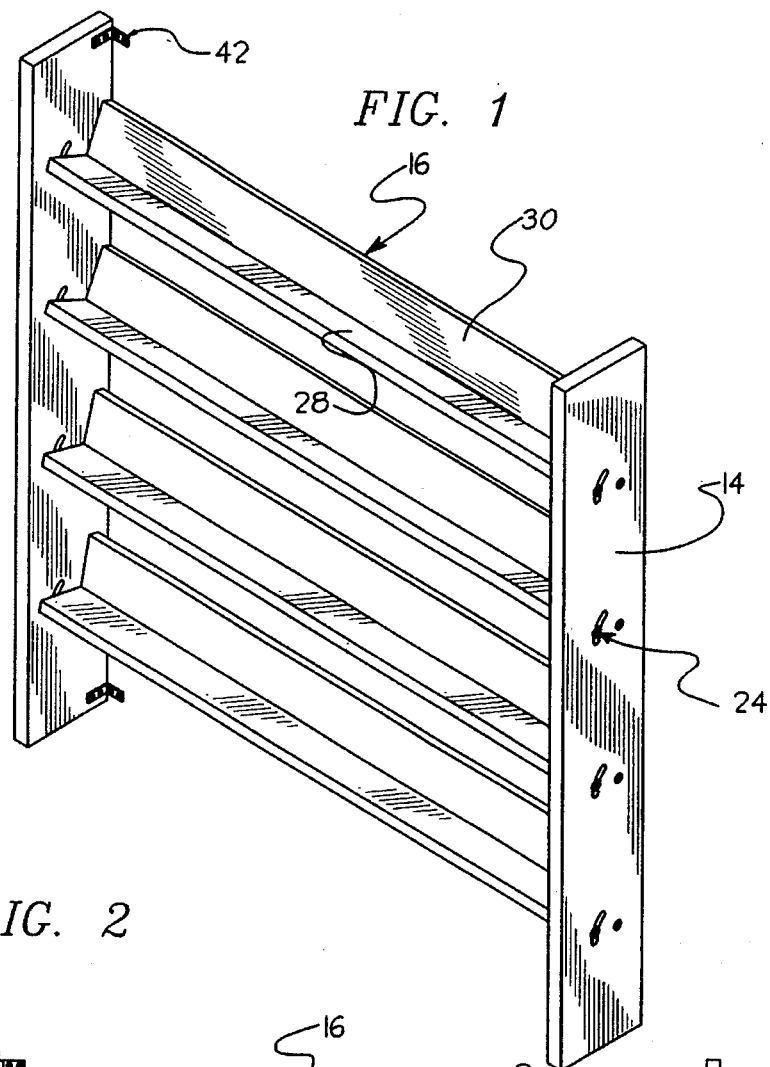
FIG. 1 is an isometric illustration of an adjustable angle wall mounted rack comprising the present invention.

With reference now to the drawings, and in particular to FIGS. 1–6 thereof, a new adjustable angle wall mounted rack embodying the principles and concepts of the present invention and generally designated by the reference numeral 10 will be described.

Figure 2:
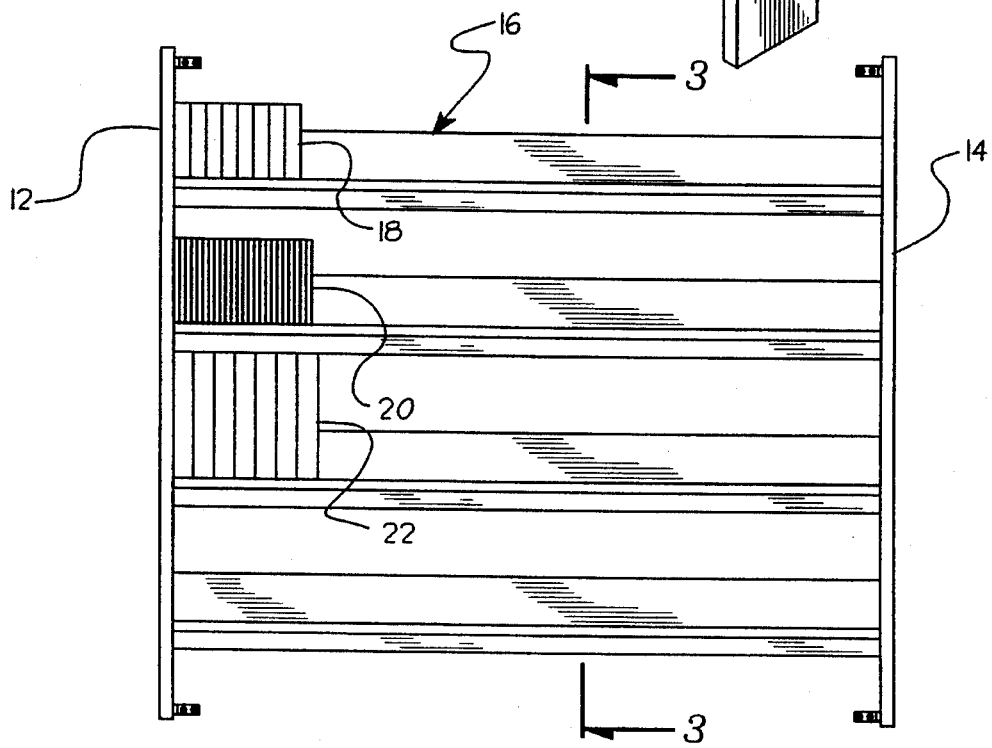
FIG. 2 is a front elevation view of the present invention.

More specifically, it will be noted that the adjustable angle wall mounted rack 10 comprises a first vertical member 12 securable adjacent to a wall surface 26, and a second vertical member 14 similarly securable to the wall surface. A plurality of shelf means 16 extend between the vertical members 12 and 14 for receiving and supporting disparately sized recording media such as tape cassettes 18, compact discs 20, and video tapes 22 relative to the vertical members 12 and 14, as shown in FIG. 2. A plurality of adjustment means 24 are provided for coupling each respectively opposed end of each of the shelf means 16 to the vertical members 12 and 14 and for permitting angular adjustment of the shelf means about a horizontal axis directed orthogonally through the vertical members 12 and 14. The adjustment means 24 permit upper rear edges of the recording media to be positioned into abutting engagement with the wall surface 26 to which the device 10 is attached. Such positioning of the upper rear edge of the recording media 18, 20, or 22 against the wall surface serves to retain the recording media in an organized and arranged orientation.

Figure 3:
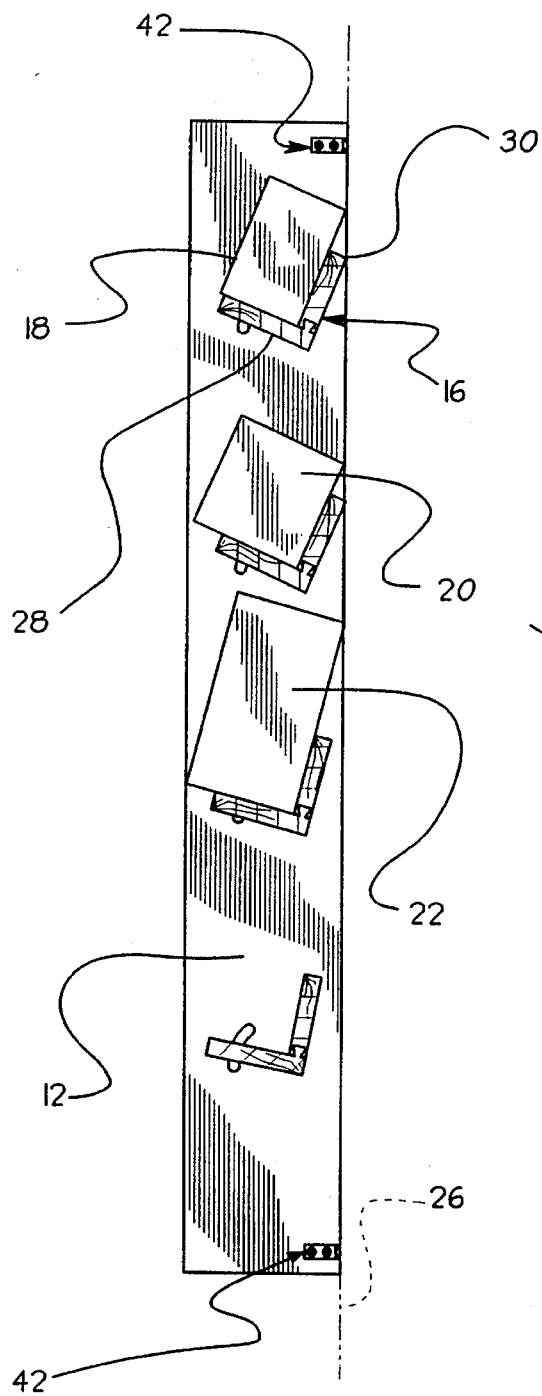
FIG. 3 is a cross sectional view taken along line 3—3 of FIG. 2.
Figure 5:
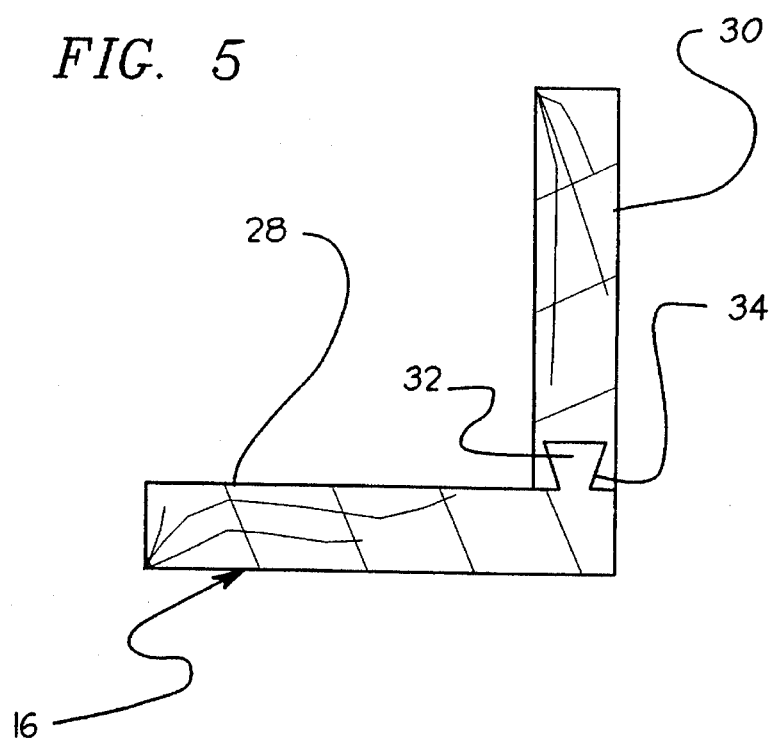
FIG. 5 is a cross sectional view taken along line 5—5 of FIG. 4.

As shown in FIGS. 1, 3, and 5, each of the shelf means 16 according to the present invention 10 comprises an elongated horizontal shelf member 28 having a first longitudinal edge spaced from a second longitudinal edge. An elongated vertical shelf member 30 similarly having a first longitudinal edge spaced from a second longitudinal edge is coupled at the first longitudinal edge thereof to the first longitudinal edge of the elongated horizontal shelf member 28. The vertical shelf member 30 is coupled to the horizontal shelf member 28 such that the vertical shelf member projects substantially orthogonally therefrom. As shown in FIG. 5, such coupling of the elongated horizontal shelf member 28 to the vertical shelf member 30 can be accomplished by an elongated projection 32 extending from an upper surface of the horizontal shelf member proximal to the first longitudinal edge thereof which slidably engages an elongated slot 34 formed in the first longitudinal edge of the vertical shelf member 30. Preferably, both the projection 32 and the slot 34 are shaped so as to define a dovetail-shaped cross section.

Figure 4:
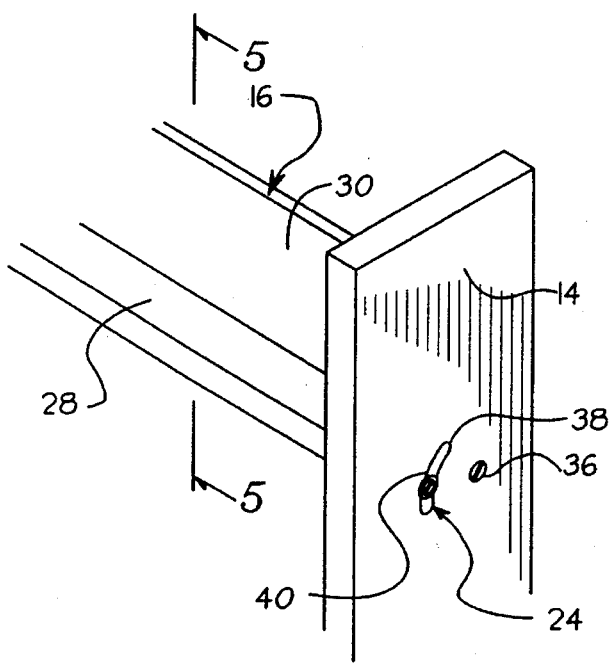
FIG. 4 is an isometric illustration of a portion of the present invention detailing the adjustment means thereof.

As shown in FIG. 4, the adjustment means 24 according to the present invention 10 preferably comprises a pivot fastener 36 directed through the respective vertical member 12 or 14 which engages the shelf means at a juncture of the elongated horizontal shelf member 28 and the vertical shelf member 30 to pivotally couple the shelf means relative thereto. An arcuate slot 38 is directed through the respective vertical member 12 or 14 proximal to the pivot fastener and is characterized as having a radius of curvature equal to a distance from the pivot fastener 36. In other words, the arcuate slot 38 is concentrically positioned relative to the pivot fastener 36. A locking fastener 40 is directed through the arcuate slot 38 and is releasably engaged to the horizontal shelf member 28. By this structure, the locking fastener can be loosened to permit a pivoting of the shelf means 16 about a horizontal axis directed through the pivot fasteners 36 of the respectively opposed vertical members 12 and 14 to facilitate positioning of the shelf means such that the upper rear edge of recording media 18, 20, or 22 placed thereon will be positioned for engagement with a wall surface to which the shelf 10 is attached. The locking fastener 40 can then be tightened to retain such position of the shelf means 16. Preferably, the fasteners 36 and 40 comprise threaded fasteners which threadably engage the shelf means 16 to permit ease of assembly and adjustment of the shelf 10.

Figure 6:
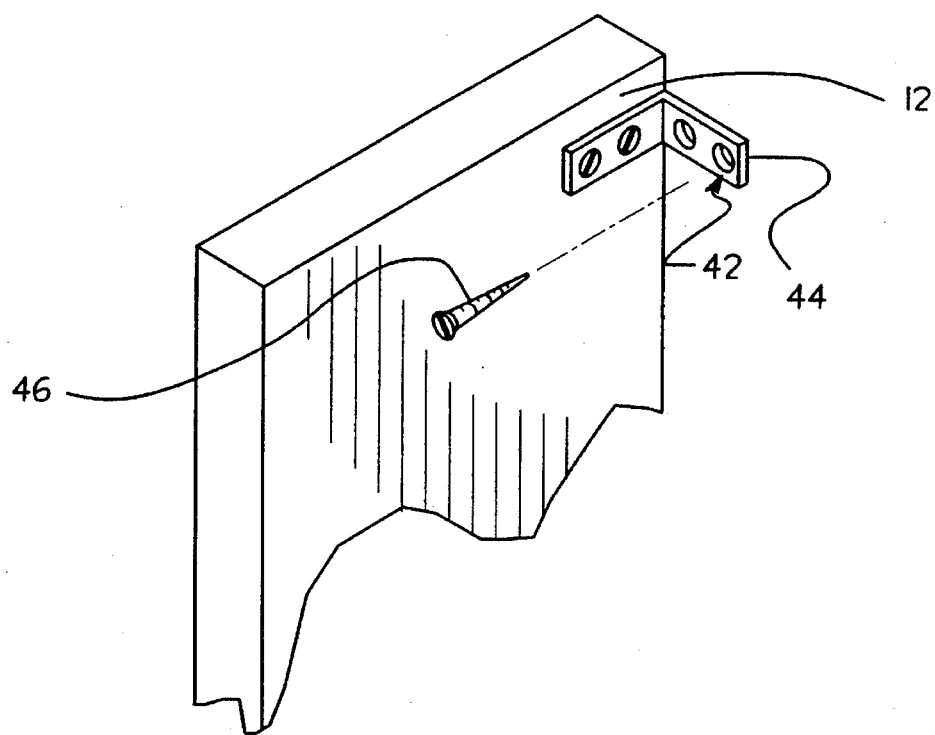
FIG. 6 is an enlarged isometric illustration of a portion of the present invention illustrating the mounting means thereof.

Turning now to FIG. 6, it can be shown that the present invention may additionally comprise a plurality of mounting means 42 for securing the vertical members 12 and 14 to a vertical wall surface 26. To this end, each of the mounting means 42 comprises an L-shaped bracket 44 secured to the respective vertical member 12 or 14 at a first portion thereof, with a second portion of the L-bracket including a through-extending aperture permitting the direction of a threaded fastener 46 or the like therethrough for engagement with the vertical wall surface 26. By this structure, the shelf 10 can be easily attached to any desired wall surface. Preferably, the shelf means 16 are so configured that a length or a distance between the vertical members 12 and 14 when the shelf 10 is assembled is equal to a whole number multiple of the typical spacing distance between studs of a building, i.e.

twelve or sixteen inches, such that fasteners 46 directed through the mounting means 42 will engage the studs of the wall.

In use, the shelf 10 according to the present invention can be easily coupled to an existing wall structure 26. The shelf means 16 can then be adjusted to accommodate any size of recording media 18, 20, or 22 such that an upper rear edge thereof engages the wall. Further, the device 10 can be utilized to retain and support video games, floppy disks, or other objects having a substantially square shape including books and boxes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and descried in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable angle wall mounted rack comprising:

a first vertical member securable to a wall surface;

a second vertical member securable to the wall surface;

a plurality of shelf means extending between the vertical members for receiving and supporting rectangular objects relative to the vertical members; and, a plurality of adjustment means for coupling each respectively opposed end of each of the shelf means to the respective vertical member and for permitting angular adjustment of the shelf means about a horizontal axis directed orthogonally through the vertical members such that upper rear edges of the rectangular objects can be positioned into abutting engagement with the wall surface, wherein each of the shelf means comprises an elongated horizontal shelf member having a first longitudinal edge spaced from a second longitudinal edge; an elongated vertical shelf member having a first longitudinal edge spaced from a second longitudinal edge coupled at the first longitudinal edge thereof to the first longitudinal edge of the elongated horizontal shelf member, wherein the vertical shelf member is coupled to the horizontal shelf member such that the vertical shelf member projects substantially orthogonally therefrom, and wherein the adjustment means comprises a pivot fastener directed through the respective vertical member which engages the shelf means proximal to a juncture of the elongated horizontal shelf member and the vertical shelf member to pivotally couple the shelf means relative thereto; the vertical members being shaped so as to define an arcuate slot directed through the respective vertical member proximal to the pivot fastener, the arcuate slot being characterized as having a radius of curvature equal to a distance between the arcuate slot and the pivot fastener such that the arcuate slot is concentrically positioned relative to the pivot fastener; and a locking fastener directed through the arcuate slot and releasably engaged to the horizontal member.

2. The adjustable angle wall mounted rack of claim 1, wherein an elongated projection extends from an upper surface of the horizontal shelf member proximal to the first longitudinal edge thereof, and the vertical shelf member is shaped so as to define an elongated slot formed in the first longitudinal edge thereof, wherein the elongated projection is slidably engaged to the elongated slot in the vertical shelf member to coupled the vertical shelf member to the horizontal shelf member.

3. The adjustable angle wall mounted rack of claim 1, and further comprising a plurality of mounting means for securing the vertical members to a vertical wall surface.

4. The adjustable angle wall mounted rack of claim 3, wherein each of the mounting means comprises an L-shaped bracket secured to the respective vertical member at a first portion of the L-bracket, with a second portion of the L-bracket including a through-extending aperture permitting the direction of a threaded fastener therethrough for engagement with the vertical wall surface.

5. The adjustable angle wall mounted rack of claim 4, wherein the shelf means are shaped such that a distance between the vertical members is equal to a whole number multiple of a spacing distance between studs of a building.

\* \* \* \* \*